(12) United States Patent
Sukhija et al.

(10) Patent No.: US 11,907,984 B2
(45) Date of Patent: Feb. 20, 2024

(54) SYSTEM, METHOD, AND COMPUTER PROGRAM PRODUCT FOR DETECTING AND PREVENTING "FRIENDLY FRAUD"

(71) Applicant: Visa International Service Association, San Francisco, CA (US)

(72) Inventors: Rohit Sukhija, Bangalore (IN); Aditya Ashok Kale, Maharashtra (IN)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/897,509

(22) Filed: Aug. 29, 2022

(65) Prior Publication Data

US 2022/0414730 A1    Dec. 29, 2022

Related U.S. Application Data

(63) Continuation of application No. 17/253,877, filed as application No. PCT/US2018/038715 on Jun. 21, 2018, now Pat. No. 11,481,824.

(51) Int. Cl.
  *G06Q 30/00*    (2023.01)
  *G06Q 30/0601*  (2023.01)

(52) U.S. Cl.
  CPC ..... *G06Q 30/0609* (2013.01); *G06Q 30/0631* (2013.01)

(58) Field of Classification Search
  None
  See application file for complete search history.

(56) References Cited

U.S. PATENT DOCUMENTS

| | | | |
|---|---|---|---|
| 6,839,682 B1 * | 1/2005 | Blume | G06Q 30/0255 705/26.1 |
| 7,634,662 B2 | 12/2009 | Monroe | |
| 8,554,670 B1 | 10/2013 | Blank et al. | |
| 9,031,877 B1 | 5/2015 | Santhana et al. | |
| 9,712,520 B1 * | 7/2017 | Canavor | H04L 67/14 |
| 10,832,248 B1 * | 11/2020 | Kramme | G06Q 20/4016 |

(Continued)

OTHER PUBLICATIONS

Peters, M.E., Emerging ecommerce credit and debit card protocols, Jan. 1, 2002, Proceedings. Third International Symposium on Electronic Commerce, pp. 39-46 (Year: 2002).*

(Continued)

*Primary Examiner* — Allison G Wood
*Assistant Examiner* — Timothy J Kang
(74) *Attorney, Agent, or Firm* — The Webb Law Firm

(57) ABSTRACT

A method for processing a chargeback request associated with at least one online transaction associated with a user includes: receiving a chargeback message associated with the at least one online transaction; based at least partially on the unfamiliar merchant name in the chargeback message, determining at least one potential familiar merchant name associated with the at least one unfamiliar merchant name; scanning a browser history of the user including browser data; determining whether the user visited a website associated with the at least one potential familiar merchant name; and generating and communicating a recommendation message including the at least one potential familiar merchant name. A system for processing a chargeback request associated with at least one online transaction associated with a user is also disclosed.

17 Claims, 7 Drawing Sheets

(56) References Cited

U.S. PATENT DOCUMENTS

| | | |
|---|---|---|
| 2005/0189412 A1 | 9/2005 | Hudnut et al. |
| 2005/0267801 A1 | 12/2005 | Kaufman |
| 2009/0259574 A1* | 10/2009 | Thomsen ............... G06Q 20/42 |
| | | 707/999.005 |
| 2009/0259674 A1 | 10/2009 | Griffen et al. |
| 2010/0114774 A1 | 5/2010 | Linaman et al. |
| 2011/0022628 A1 | 1/2011 | Kramer et al. |
| 2013/0268340 A1 | 10/2013 | Colon et al. |
| 2015/0032604 A1 | 1/2015 | Kearns et al. |
| 2016/0034917 A1 | 2/2016 | Gerard et al. |
| 2018/0025354 A1* | 1/2018 | Groarke ............... G06Q 20/382 |
| | | 705/44 |

OTHER PUBLICATIONS

Peters, "Emerging eCommerce Credit and Debit Card Protocols", Proceedings of the 3rd International Symposium on Electronic Commerce, Jan. 1, 2002, pp. 39-46.

* cited by examiner

| | | | |
|---|---|---|---|
| | User Statement | | |
| 7/9/2017 | Family Restaurant 1 | $ | 34.10 |
| 7/9/2017 | Supermarket 1 | $ | 98.52 |
| 7/15/2017 | Electric Company | $ | 55.23 |
| 7/18/2017 | Family Restaurant 1 | $ | 20.22 |
| 7/23/2017 | Family Restaurant 1 | $ | 20.22 |
| 7/26/2017 | Produce Market 1 | $ | 15.12 |
| 7/26/2017 | Family Restaurant 1 | $ | 78.65 |
| 7/26/2017 | Bigbox Store 1 | $ | 105.21 |
| 7/29/2017 | Sewage Co. Auto Withdrawal | $ | 63.00 |
| 8/2/2017 | Family Restaurant 2 | $ | 47.26 |
| 8/2/2017 | Acme Inc. | $ | 21.23 |
| 8/3/2017 | Payment Gateway 1 | $ | 67.89 |
| 8/5/2017 | Sporting Goods Depot | $ | 32.66 |
| 8/7/2017 | Gymnasium Auto Withdrawal | $ | 25.00 |

FIG. 2

Payment Gateway Database

| Payment Gateway | Payment URL | Association Score |
|---|---|---|
| Payment Gateway 1 | https://secure/pg1 | 98 |
| Payment Gateway 2 | https://secure/pg2 | 56 |
| Payment Gateway 3 | https://secure/pg3 | 85 |

FIG. 5

User Browsing History

| Website Visited | Time Visited |
|---|---|
| www.website1.com | 6:31:15 PM |
| www.website2.com | 6:32:23 PM |
| www.HIS.com | 6:35:33 PM |
| https://secure/pg1 | 6:36:12 PM |
| www.HIS.com | 6:37:45 PM |
| www.website3.com | 6:37:51 PM |

FIG. 6

| Business Entity | Business Entity URL | Payment Gateway | Association Score |
|---|---|---|---|
| Home Improvement Store | www.HIS.com | Payment Gateway 1 | 83 |

SYSTEM, METHOD, AND COMPUTER PROGRAM PRODUCT FOR DETECTING AND PREVENTING "FRIENDLY FRAUD"

CROSS REFERENCE TO RELATED APPLICATIONS

This application a continuation application of U.S. patent application Ser. No. 17/253,877 filed Jun. 21, 2018, which is the United States national phase of International Application No. PCT/US2018/038715 filed Jun. 21, 2018, the disclosures of which are hereby incorporated by reference in their entirety.

BACKGROUND

Technical Field

The disclosure relates to a system and method for detecting and preventing "friendly fraud" and, in one particular embodiment, to a system and method for processing a chargeback request associated with at least one online transaction associated with a user.

Technical Description

"Friendly fraud" is defined as chargeback fraud that occurs when a user (e.g., a consumer) makes an online shopping purchase from a merchant using their portable financial device (e.g., a credit card), and then requests a chargeback from the issuer after receiving the purchased goods or services. One common reason "friendly fraud" occurs is that the user making the chargeback request does not recognize the merchant listed on the user's statement. This can be because the merchant name listed on the statement is the legal name of the merchant, as opposed to its tradename, which is familiar to the user, or the merchant name listed is actually the name of the payment gateway used by the merchant.

Activities associated with processing chargeback requests are often expensive to the various entities involved in the transaction processing, such as the issuer, acquirer, transaction service provider, and merchant. Therefore, it would be desirable to be able to detect and prevent "friendly fraud" and to reduce processing of chargeback requests associated therewith.

SUMMARY

Accordingly, and generally, provided is an improved system and method for processing a chargeback request associated with at least one online transaction associated with a user.

According to some non-limiting embodiments or aspects, provided is a method for processing a chargeback request associated with at least one online transaction associated with a user, including: receiving from a computing device of a user, with at least one processor, a chargeback message associated with the at least one online transaction between the user and at least one merchant, where the chargeback message includes at least one unfamiliar merchant name associated with the at least one merchant; based at least partially on the unfamiliar merchant name in the chargeback message, determining, with at least one processor, at least one potential familiar merchant name associated with the at least one unfamiliar merchant name; in response to determining the at least one potential familiar merchant name, scanning, with at least one processor, a browser history of the user including browser data; determining, with at least one processor, based at least partially on the browser data, whether the user visited a website associated with the at least one potential familiar merchant name; and in response to determining that the user visited the website associated with the at least one potential familiar merchant name, generating and communicating to the computing device, with at least one processor, a recommendation message including the at least one potential familiar merchant name.

In some non-limiting embodiments or aspects, the method may further include receiving from the computing device in response to the recommendation message, with at least one processor, a confirmation message associating the at least one unfamiliar merchant name with the at least one potential familiar merchant name. The method may further include, in response to receiving the confirmation message, updating, with at least one processor, an association score of the at least one potential familiar merchant name, the association score indicating the likelihood that the at least one potential familiar merchant name is associated with an unfamiliar merchant name. The method may further include, in response to a second, subsequent chargeback message including the at least one unfamiliar merchant name, determining, with at least one processor, the at least one potential familiar merchant name based partially on the association score of the at least one potential familiar merchant name. The method may further include receiving from the computing device in response to the recommendation message, with at least one processor, a rejection message disassociating the at least one unfamiliar merchant name with the at least one potential familiar merchant name; and in response to the rejection message, initiating, with at least one processor, a fraud response protocol. The method may further include, in response to receiving the rejection message, updating, with at least one processor, an association score of the at least one potential familiar merchant name, the association score indicating the likelihood that the at least one potential familiar merchant name is associated with an unfamiliar merchant name.

In some non-limiting embodiments or aspects, the determining of the at least one potential familiar merchant name may include: scanning a database including a plurality of unfamiliar merchant names each associated with at least one potential familiar merchant name; and determining the at least one potential familiar merchant name based at least partially on a match between at least one of the plurality of unfamiliar merchant names and the associated at least one potential familiar merchant name. The determining of the at least one potential familiar merchant name may include: scanning, with at least one processor, at least one data resource by initiating a search process including at least a portion of the at least one unfamiliar merchant name; and in response to the results of the search process, determining the at least one potential familiar merchant name. The at least one data resource may include at least one of the following: the Internet, a remote database, a third party database, a crowd-sourced database, a database local to the computing device, a database associated with the user, or any combination thereof. The determining of the at least one potential familiar merchant name may include determining a plurality of potential familiar merchant names. The at least one unfamiliar merchant name may be a name corresponding to a payment gateway associated with the at least one potential familiar merchant name. The method may further include: communicating, with at least one processor, an update request to a merchant system of the at least one merchant associated with the at least one unfamiliar merchant name, the update request including instructions for the merchant system to update the at least one unfamiliar merchant name with the at least one potential familiar merchant name.

According to some non-limiting embodiments or aspects, provided is a system for processing a chargeback request associated with an online transaction associated with a user including at least one processor programmed and/or configured to: receive from a computing device of a user a chargeback message associated with the at least one online transaction between the user and at least one merchant, where the chargeback message includes at least one unfamiliar merchant name associated with the at least one merchant; based at least partially on the unfamiliar merchant name in the chargeback message, determine at least one potential familiar merchant name associated with the at least one unfamiliar merchant name; in response to determining the at least one potential familiar merchant name, scan a browser history of the user including browser data; determine, based at least partially on the browser data, whether the user visited a website associated with the at least one potential familiar merchant name; and in response to determining that the user visited the website associated with the at least one potential familiar merchant name, generate and communicate to the computing device a recommendation message including the at least one potential familiar merchant name.

In some non-limiting embodiments or aspects, the at least one processor may be further programmed and/or configured to: receive from the computing device in response to the recommendation message a confirmation message associating the at least one unfamiliar merchant name with the at least one potential familiar merchant name. The at least one processor may be further programmed and/or configured to: in response to receiving the confirmation message, update an association score of the at least one potential familiar merchant name, the association score indicating the likelihood that the at least one potential familiar merchant name is associated with an unfamiliar merchant name. The at least one processor may be further programmed and/or configured to: receive from the computing device in response to the recommendation message a rejection message disassociating the at least one unfamiliar merchant name with the at least one potential familiar merchant name; and in response to the rejection message, initiate a fraud response protocol. The at least one processor may be further programmed and/or configured to: in response to receiving the rejection message, update an association score of the at least one potential familiar merchant name, the association score indicating the likelihood that the at least one potential familiar merchant name is associated with an unfamiliar merchant name.

In some non-limiting embodiments or aspects, to determine the at least one potential familiar merchant name, the at least one processor may be programmed and/or configured to: scan a database including a plurality of unfamiliar merchant names each associated with at least one potential familiar merchant name; and determine the at least one potential familiar merchant name based at least partially on a match between at least one of the plurality of unfamiliar merchant names and the associated at least one potential familiar merchant name. The at least one processor may be further programmed and/or configured to: scan at least one data resource by initiating a search process including at least a portion of the at least one unfamiliar merchant name; and in response to the results of the search process, determine the at least one potential familiar merchant name. The at least one data resource may include at least one of the following: the Internet, a remote database, a third party database, a crowd-sourced database, a database local to the computing device, a database associated with the user, or any combination thereof. The determining of the at least one potential familiar merchant name may include determining a plurality of potential familiar merchant names. The at least one unfamiliar merchant name may be a name corresponding to a payment gateway associated with the at least one potential familiar merchant name.

Further non-limiting embodiments or aspects are set forth in the following numbered clauses:

Clause 1: A method for processing a chargeback request associated with at least one online transaction associated with a user, comprising: receiving from a computing device of a user, with at least one processor, a chargeback message associated with the at least one online transaction between the user and at least one merchant, wherein the chargeback message comprises at least one unfamiliar merchant name associated with the at least one merchant; based at least partially on the unfamiliar merchant name in the chargeback message, determining, with at least one processor, at least one potential familiar merchant name associated with the at least one unfamiliar merchant name; in response to determining the at least one potential familiar merchant name, scanning, with at least one processor, a browser history of the user comprising browser data; determining, with at least one processor, based at least partially on the browser data, whether the user visited a website associated with the at least one potential familiar merchant name; and in response to determining that the user visited the website associated with the at least one potential familiar merchant name, generating and communicating to the computing device, with at least one processor, a recommendation message comprising the at least one potential familiar merchant name.

Clause 2: The method of clause 1, further comprising: receiving from the computing device in response to the recommendation message, with at least one processor, a confirmation message associating the at least one unfamiliar merchant name with the at least one potential familiar merchant name.

Clause 3: The method of clause 1 or 2, further comprising: in response to receiving the confirmation message, updating, with at least one processor, an association score of the at least one potential familiar merchant name, the association score indicating the likelihood that the at least one potential familiar merchant name is associated with an unfamiliar merchant name.

Clause 4: The method of any of clauses 1-3, further comprising: in response to a second, subsequent chargeback message comprising the at least one unfamiliar merchant name, determining, with at least one processor, the at least one potential familiar merchant name based partially on the association score of the at least one potential familiar merchant name.

Clause 5: The method of any of clauses 1-4, further comprising: receiving from the computing device in response to the recommendation message, with at least one processor, a rejection message disassociating the at least one unfamiliar merchant name with the at least one potential familiar merchant name; and in response to the rejection message, initiating, with at least one processor, a fraud response protocol.

Clause 6: The method of any of clauses 1-5, further comprising: in response to receiving the rejection message, updating, with at least one processor, an association score of the at least one potential familiar merchant name, the association score indicating the likelihood that the at least one potential familiar merchant name is associated with an unfamiliar merchant name.

Clause 7: The method of any of clauses 1-6, wherein the determining of the at least one potential familiar merchant name comprises: scanning a database comprising a plurality of unfamiliar merchant names each associated with at least one potential familiar merchant name; and determining the at least one potential familiar merchant name based at least partially on a match between at least one of the plurality of unfamiliar merchant names and the associated at least one potential familiar merchant name.

Clause 8: The method of any of clauses 1-7, wherein the determining of the at least one potential familiar merchant name comprises: scanning, with at least one processor, at least one data resource by initiating a search process including at least a portion of the at least one unfamiliar merchant name; and in response to the results of the search process, determining the at least one potential familiar merchant name.

Clause 9: The method of any of clauses 1-8, wherein the at least one data resource comprises at least one of the following: the Internet, a remote database, a third party database, a crowd-sourced database, a database local to the computing device, a database associated with the user, or any combination thereof.

Clause 10: The method of any of clauses 1-9, wherein the determining of the at least one potential familiar merchant name comprises determining a plurality of potential familiar merchant names.

Clause 11: The method of any of clauses 1-10, wherein the at least one unfamiliar merchant name is a name corresponding to a payment gateway associated with the at least one potential familiar merchant name.

Clause 12: The method of any of clauses 1-11, further comprising: communicating, with at least one processor, an update request to a merchant system of the at least one merchant associated with the at least one unfamiliar merchant name, the update request including instructions for the merchant system to update the at least one unfamiliar merchant name with the at least one potential familiar merchant name.

Clause 13: A system for processing a chargeback request associated with an online transaction associated with a user comprising at least one processor programmed and/or configured to: receive from a computing device of a user a chargeback message associated with the at least one online transaction between the user and at least one merchant, wherein the chargeback message comprises at least one unfamiliar merchant name associated with the at least one merchant; based at least partially on the unfamiliar merchant name in the chargeback message, determine at least one potential familiar merchant name associated with the at least one unfamiliar merchant name; in response to determining the at least one potential familiar merchant name, scan a browser history of the user comprising browser data; determine, based at least partially on the browser data, whether the user visited a website associated with the at least one potential familiar merchant name; and in response to determining that the user visited the website associated with the at least one potential familiar merchant name, generate and communicate to the computing device a recommendation message comprising the at least one potential familiar merchant name.

Clause 14: The system of clause 13, wherein the at least one processor is further programmed and/or configured to: receive from the computing device in response to the recommendation message a confirmation message associating the at least one unfamiliar merchant name with the at least one potential familiar merchant name.

Clause 15: The system of clause 13 or 14, wherein the at least one processor is further programmed and/or configured to: in response to receiving the confirmation message, update an association score of the at least one potential familiar merchant name, the association score indicating the likelihood that the at least one potential familiar merchant name is associated with an unfamiliar merchant name.

Clause 16: The system of any of clauses 13-15, wherein the at least one processor is further programmed and/or configured to: receive from the computing device in response to the recommendation message a rejection message disassociating the at least one unfamiliar merchant name with the at least one potential familiar merchant name; and in response to the rejection message, initiate a fraud response protocol.

Clause 17: The system of any of clauses 13-16, wherein the at least one processor is further programmed and/or configured to: in response to receiving the rejection message, update an association score of the at least one potential familiar merchant name, the association score indicating the likelihood that the at least one potential familiar merchant name is associated with an unfamiliar merchant name.

Clause 18: The system of any of clauses 13-17, wherein to determine the at least one potential familiar merchant name, the at least one processor is programmed and/or configured to: scan a database comprising a plurality of unfamiliar merchant names each associated with at least one potential familiar merchant name; and determine the at least one potential familiar merchant name based at least partially on a match between at least one of the plurality of unfamiliar merchant names and the associated at least one potential familiar merchant name.

Clause 19: The system of any of clauses 13-18, wherein the at least one processor is further programmed and/or configured to: scan at least one data resource by initiating a search process including at least a portion of the at least one unfamiliar merchant name; and in response to the results of the search process, determine the at least one potential familiar merchant name.

Clause 20: The system of any of clauses 13-19, wherein the at least one data resource comprises at least one of the following: the Internet, a remote database, a third party database, a crowd-sourced database, a database local to the computing device, a database associated with the user, or any combination thereof.

Clause 21: The system of any of clauses 13-20, wherein the determining of the at least one potential familiar merchant name comprises determining a plurality of potential familiar merchant names.

Clause 22: The system of any of clauses 13-21, wherein the at least one unfamiliar merchant name is a name corresponding to a payment gateway associated with the at least one potential familiar merchant name.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying schematic figures, in which:

FIG. 2 shows a user statement including at least one unfamiliar merchant name;

FIG. 5 shows database entries of a database including data associated with payment gateways;

FIG. 6 shows a user Internet browsing history;

FIG. 7 shows a database entry associating a business entity with a payment gateway;

DETAILED DESCRIPTION

Figure 1:
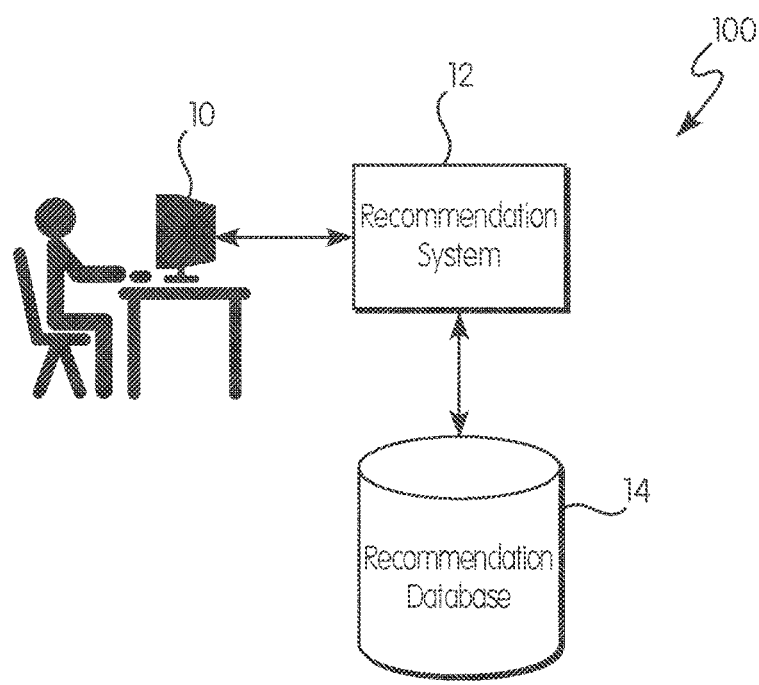
FIG. 1 shows a schematic view of one non-limiting embodiments or aspects of a system for processing a chargeback request according to the present disclosure.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet, and/or the like) that includes data. It will be appreciated that numerous other arrangements are possible.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing server" may refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, the term "issuer institution" or "issuer" may refer to one or more entities, such as a bank, that provide accounts to customers for conducting transactions (e.g., payment transactions), such as initiating credit and/or debit payments. For example, an issuer institution may provide an account identifier, such as a personal account number (PAN), to a customer that uniquely identifies one or more accounts associated with that customer. The account identifier may be embodied on a portable financial device, such as a physical financial instrument, e.g., a payment card, and/or may be electronic and used for electronic payments. The term "issuer system" refers to one or more computer systems operated by or on behalf of an issuer institution, such as a server computer executing one or more software applications. For example, an issuer system may include one or more authorization servers for authorizing a transaction.

As used herein, the term "acquirer institution" or "acquirer" may refer to an entity licensed and/or approved by the transaction service provider to originate transactions (e.g., payment transactions) using a portable financial device associated with the transaction service provider. The transactions the acquirer institution may originate may include payment transactions (e.g., purchases, original credit transactions (OCTs), account funding transactions (AFTs), and/or the like). In some non-limiting embodiments or aspects, an acquirer institution may be a financial institution, such as a bank. As used herein, the term "acquirer system" may refer to one or more computer systems, computer devices, software applications, and/or the like operated by or on behalf of an acquirer institution.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases, and/or the like) such that they may be used to conduct a transaction without directly using the original account identifier. In some examples, an original account identifier, such as a PAN, may be associated with a plurality of tokens for different individuals or purposes.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

The term "user device," as used herein, refers to any electronic device that is configured to communicate with one or more remote devices or systems, such as a server. A user device may include a desktop computer, laptop computer, mobile computer (e.g., smartphone), a wearable computer (e.g., a watch, pair of glasses, lens, clothing, and/or the like), a cellular phone, a network-enabled appliance (e.g., a network-enabled television, refrigerator, thermostat, and/or the like), a point of sale (POS) system, and/or any other device, system, and/or software application configured to communicate with a remote device or system.

As used herein, the term "portable financial device" may refer to a payment device, an electronic payment device, a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments or aspects, the portable financial device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

As used herein, the term "server" may refer to or include one or more processors or computers, storage devices, or similar computer arrangements that are operated by or facilitate communication and processing for multiple parties in a network environment, such as the internet, although it will be appreciated that communication may be facilitated over one or more public or private network environments and that various other arrangements are possible. Further, multiple computers, e.g., servers, or other computerized devices, e.g., point-of-sale devices, directly or indirectly communicating in the network environment may constitute a "system," such as a merchant's point-of-sale system.

Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments or aspects of the present disclosure are directed to a method and system for processing a chargeback request associated with at least one online transaction associated with a user. Some non-limiting embodiments or aspects of the present disclosure allow for entities involved in processing payment transactions and chargeback requests (e.g., issuers, transaction service providers, acquirers, and merchants) to identify and prevent processing of chargeback requests associated with "friendly fraud". The present disclosure allows for a recommendation to be generated that suggests at least one potential familiar merchant name associated with the unfamiliar merchant name listed on the user's statement, the unfamiliar merchant name being associated with the chargeback request from the user. The present disclosure allows for browser data of the user to be scanned, which allows the system to more accurately determine whether the user visited a website associated with the potential familiar merchant name, allowing for a more accurate recommendation to be generated. The present disclosure provides for the user to either confirm or reject whether the suggested potential familiar merchant name is the merchant name associated with the unfamiliar merchant name listed on the user's statement, which allows chargeback requests associated with "friendly fraud" to be identified before processing. The present disclosure allows for crowd-sourced data to be utilized to determine the potential familiar merchant name so that previous chargeback messages identifying the same unfamiliar merchant name may be considered when determining the potential familiar merchant name, enhancing efficiency and accuracy of the determination of the potential familiar merchant name. The present disclosure also allows for a merchant system to be notified of an unfamiliar merchant name, such that the merchant can update its unfamiliar merchant name with the familiar merchant name. This feature allows future chargeback requests associated with "friendly fraud" to be avoided altogether.

Referring to FIG. 1, a system 100 for processing a chargeback request according to some non-limiting embodiments or aspects of the present disclosure is shown. As used herein, a "chargeback" is a return of funds associated with a payment transaction initiated using a portable financial device to a user (e.g., a consumer). In certain examples, the chargeback returns funds to the user's bank account from the merchant's bank account. A chargeback may be initiated by a user submitting a chargeback request. The chargeback request may be submitted to an issuer of the portable financial device and/or the financial service provider associated with the portable financial device and identify the specific transaction(s) for which the chargeback is requested. The chargeback request may be submitted for any number of reasons, including a user claim that the transaction is a fraudulent transaction (a transaction that the user did not initiate). Chargeback requests undergo thorough processing, and the merchant may have a chance to dispute the chargeback request by showing that the user did indeed make the purchase (e.g., that the purchase was not a fraudulent purchase). The system 100 shown in FIG. 1 allows for chargeback requests associated with "friendly fraud" to be detected and prevented, significantly enhancing the overall efficiency and accuracy associated with processing payment transactions and chargeback requests.

With continued reference to FIG. 1, the system 100 may include a user device 10 associated with a user who initiated a payment transaction with a merchant. The transaction may have been an online transaction (a transaction initiated using a user device of a user). The user device 10 may be in communication with a recommendation system 12 operated by or on behalf of the issuer, transaction service provider, acquirer, and/or merchant. The recommendation system may reside on an issuer system or may be a browser extension installed on the user device 10. The recommendation system 12 may be in communication with a recommendation database 14, which may store data associated with unfamiliar merchant names and familiar merchant names (as hereinafter described). The recommendation database 14 may store data associated with payment gateways and merchants associated with the payment gateways (as hereinafter described). The recommendation database 14 may store various association scores (as hereinafter described).

Referring to FIG. 2, a user statement 16 (e.g., a credit card statement) listing transactions initiated by a user over a time period associated with a portable financial device of the user is shown. The user statement 16 may include any relevant information associated with transactions initiated by the user using the portable financial device. The user statement 16 may, for example, include the date on which the transaction was initiated, the merchant name, and the amount of the transaction.

With continued reference to FIG. 2, the merchant name listed on the user statement 16 may be an unfamiliar merchant name. As used herein, an "unfamiliar merchant name" is a merchant identifier (e.g., a name) associated with the merchant that is different enough from a tradename of the merchant associated by the user with a particular transaction listed in the user statement such that the user does not associate the unfamiliar merchant name with the particular transaction. Non-limiting embodiments or aspects of unfamiliar merchant names may include legal names of a business entity different from the tradename of the merchant, the name of a payment gateway associated with the merchant different from the tradename of the merchant, the name of an entity known to the user but not associated by the user with the transaction, or any other merchant identifier the user does not associate with the transaction listed in the user's statement. For example, a user may purchase a wristwatch online from Brand X of Company X, and the merchant name shown on the user statement may be Company Y (the unfamiliar merchant name), where Company Y is a parent company of Company X, a fact that is not known to the user. Even though the user is aware of Company X and Company Y, Company Y may be considered an "unfamiliar merchant name" because its presence on the user statement causes the user to not recognize the transaction (because the user does not associate Company Y with the listed transaction and expected Company X to be the merchant listed on the user's statement). Thus, "unfamiliar merchant name" does not necessarily refer to the user not recognizing the merchant name listed but refers to the user not associating the listed transaction with the listed merchant on the user statement. As used herein, a "familiar merchant name" is a merchant name that is similar enough to a tradename of the merchant associated by the user with a particular transaction listed in the user statement such that the user does associate the familiar merchant name with the particular transaction.

One non-limiting embodiment or aspect of an unfamiliar merchant name 18 shown in FIG. 2 may be a legal identifier (name) of the merchant that is not similar enough to the tradename of the merchant to be recognizable by the user. Another non-limiting embodiment or aspect of an unfamiliar merchant name 20 shown in FIG. 2 may be an identifier (a name) of a payment gateway associated with the merchant (the user statement 16 lists the payment gateway name instead of the merchant name).

Referring to FIGS. 1 and 2, the user device 10 may communicate a chargeback message to initiate a chargeback request, the chargeback message identifying a payment transaction (e.g., online transaction) between the user and a merchant to the recommendation system 12. The chargeback message may request a chargeback associated with the transaction. The chargeback message may include an unfamiliar merchant name associated with the merchant of the transaction (the name the user does not recognize on the user statement 16).

With continued reference to FIGS. 1 and 2, the recommendation system 12 may determine a potential familiar merchant name associated with the submitted unfamiliar merchant name in the chargeback message. The recommendation system 12 may determine a potential familiar merchant name for the unfamiliar merchant name by communicating with the recommendation database 14 (and other devices and database as described herein). The recommendation database 14 may include data that associates potential familiar merchant names with unfamiliar merchant names. The recommendation system 12 may determine a potential familiar merchant name based on a match in the recommendation database 14 between the unfamiliar merchant name in the chargeback message and a potential familiar merchant name. This data may include crowd-sourced data that associates potential familiar merchant names with unfamiliar merchant names based on potential familiar merchant name-unfamiliar merchant name associations previous users have identified as correct. The recommendation database 14 may include data regarding payment gateways because unfamiliar merchant names are commonly payment gateways associated with the merchant. The data regarding the payment gateway may include the payment gateway identifier (e.g., a name) and a URL associated with the gateway. The recommendation database 14 may include any other suitable information for determining a potential familiar merchant name associated with an unfamiliar merchant name on the user statement 16.

The recommendation system 12 may communicate with any other data resource to determine a potential familiar merchant name. For example, the recommendation system 12 may communicate with the Internet (a website thereof), a remote database (remote from the recommendation system 12), a crowd-sourced database containing crowd-sourced data a previously described, a database local to the user device 10, and/or a database associated with the user. The recommendation system 12 may communicate with any number of data resources to determine the potential familiar merchant name.

With continued reference to FIGS. 1 and 2, the recommendation system 12 may communicate with the user device 10 to generate and communicate thereto a recommendation of the potential familiar merchant name associated with the unfamiliar merchant name identified in the chargeback message. The recommendation system 12 may communicate with the user device 10 to scan a browser history including browser data of the user device 10. The user device 10 may grant the recommendation system 12 permission to scan the browser data of the user device 10. The recommendation system 12 may scan the browser history of the user device 10 to determine whether the user device 10 visited a website associated with the potential familiar merchant name merchant and/or the payment gateway thereof.

When communicating with the various available data sources and scanning the user device 10, the recommendation system 12 may search based on at least a portion of the unfamiliar merchant name or may search on the entire merchant name. For example, the recommendation system 12 may split the unfamiliar merchant name into words or special characters or concatenate combinations of words to more accurately determine whether the unfamiliar merchant name may be associated with a potential familiar merchant name.

With continued reference to FIGS. 1 and 2, the recommendation system 12 may generate and communicate a recommendation message to the user device 10. The recommendation message may be generated and communicated in response to the recommendation system 12 determining that the user visited a website associated with the potential familiar merchant name and/or the payment gateway thereof. The recommendation message may include the potential familiar merchant name. The recommendation message may include a plurality of potential familiar merchant names if multiple potential familiar merchant names are possible, and the user may confirm or reject each of the plurality of potential familiar merchant names individually, as described herein.

With continued reference to FIGS. 1 and 2, the recommendation system 12 may receive a confirmation message from the user device 10 in response to the user device 10 receiving the recommendation message. The confirmation message may associate the unfamiliar merchant name from the chargeback message with the potential familiar merchant name from the recommendation message. In this way, the confirmation message may confirm that the potential familiar merchant name recommended by the recommendation system 12 is associated with the unfamiliar merchant name and that the user indeed initiated the transaction in question. In response to receiving a confirmation message, the recommendation system 12 or an issuer system of the portable financial device may forgo further processing of the chargeback request (because the user did initiate the transaction and the chargeback request was associated with "friendly fraud" and was not a fraudulent transaction).

With continued reference to FIGS. 1 and 2, the recommendation system 12 may receive a rejection message from the user device 10 in response to the user device 10 receiving the recommendation message. The rejection message may disassociate the unfamiliar merchant name from the chargeback message with the potential familiar merchant name from the recommendation message. In this way, the recommendation message may communicate that the potential familiar merchant name recommended by the recommendation system 12 is not associated with the unfamiliar merchant name and that the user maintains that it did not initiate the transaction in question. In response to receiving a rejection message, the recommendation system 12 or an issuer system of the portable financial device may initiate a fraud response protocol. The fraud response protocol may include further processing the chargeback request. The fraud response protocol may include communicating with the user that the account data associated with the portable financial device may have been fraudulently obtained and used. The fraud response protocol may halt any further transactions from being initiated by the portable financial device until further fraud investigation is completed.

Figure 3:
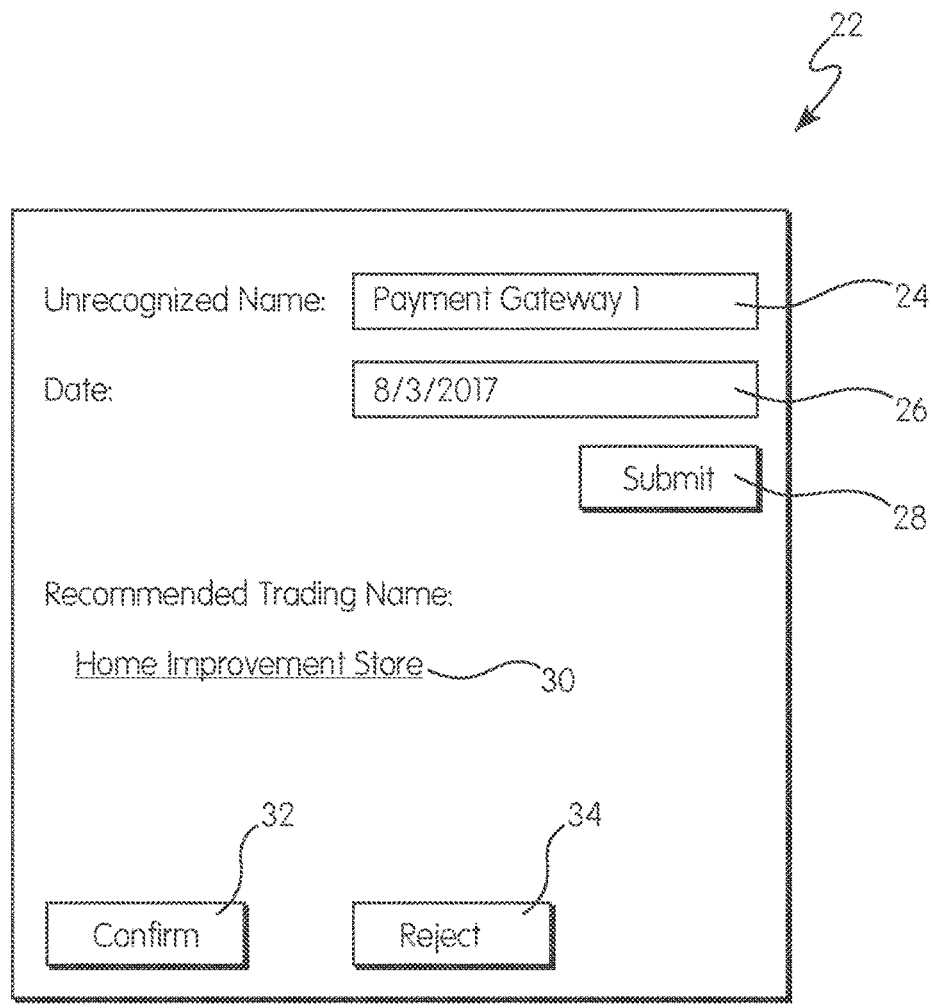
FIG. 3 shows a graphical user interface displayed in a system for processing a chargeback request.

Referring to FIG. 3, a non-limiting embodiment or aspect of a graphical user interface (GUI) 22 displayed in a system for processing a chargeback request is shown. It will be appreciated that the GUI 22 shown in FIG. 3 is non-limiting, and the user may submit chargeback messages using any suitable GUI. In the embodiment or aspect shown in FIG. 3, the user may submit a chargeback message to the recommendation system 12 using the user device 10. The GUI 22 may be accessible to the user via an Internet connection, such that the chargeback message is communicated from the user device 10 to the recommendation system 12 over a secure Internet connection. For example, the chargeback message may be submitted to the recommendation system 12 by the user device 10 accessing a website associated with the recommendation system 12 or accessing a mobile application of the recommendation system on the user device 10 (which may be a mobile phone). The recommendation system 12 may be a browser plug in to the user device 10.

With continued reference to FIG. 3, the user may enter the unfamiliar merchant name to a freeform field 24 of the GUI 22. The user may also enter the date of the transaction into a freeform field 26 and may enter any other relevant data required or requested by the GUI 22. The user may submit the chargeback message using a submit button 28. In response to the user clicking the submit button 28 to submit the chargeback message, the recommendation system 12 may determine, generate, and communicate a potential familiar merchant name (as previously described), and the determined potential familiar merchant name may be displayed in a field 30 of the GUI 22.

The GUI 22 may also include a confirm button 32 that allows the user device 10 to click to communicate a confirmation message to the recommendation system 12. The GUI 22 may also include a reject button 34 that allows the user device 10 to click to communicate a rejection message to the recommendation system 12.

Figure 4:
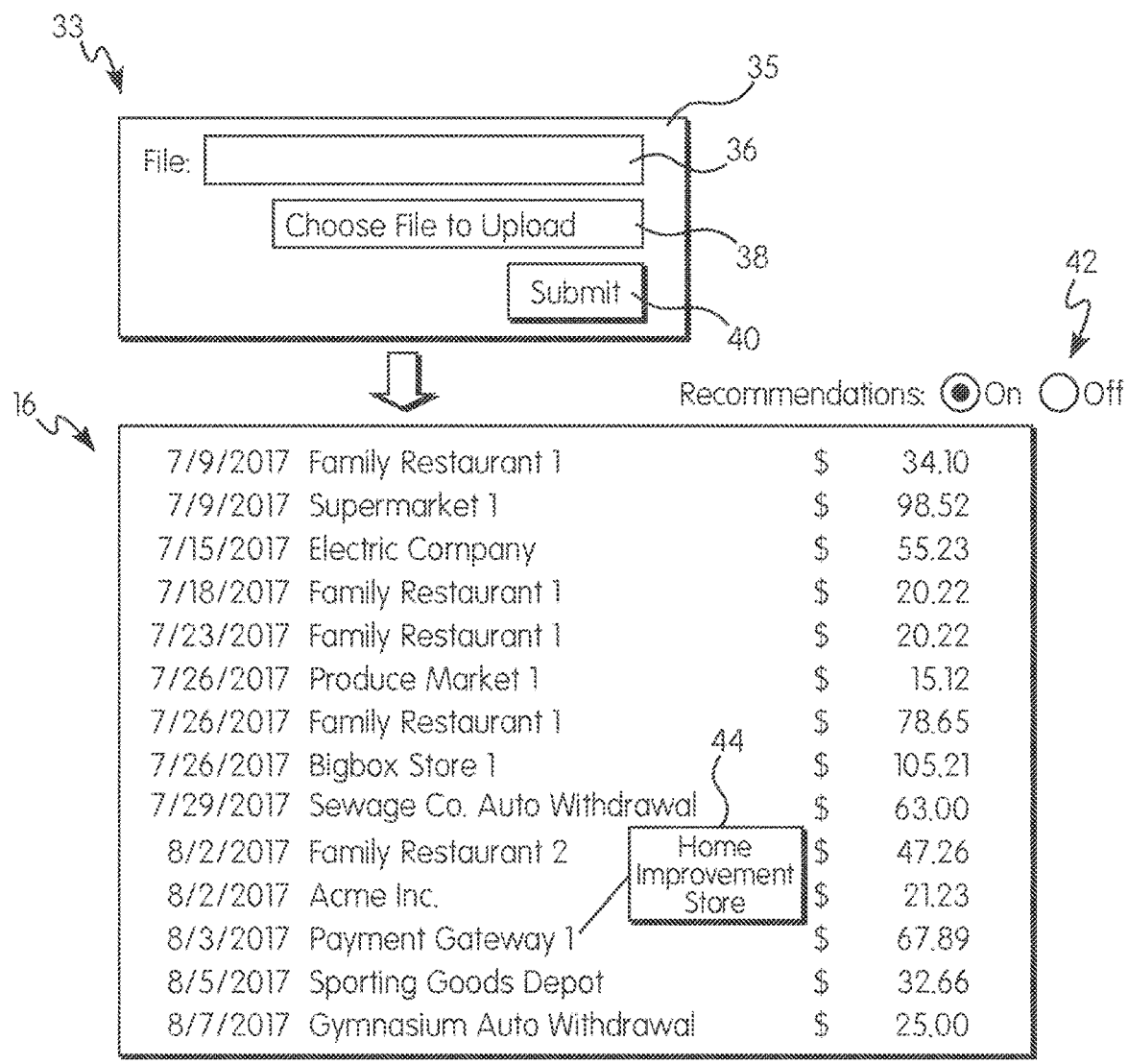
FIG. 4 shows another graphical user interface displayed in a system for processing a chargeback request.

Referring to FIG. 4, another non-limiting embodiment or aspect of a GUI 33 displayed in a system for processing a chargeback request is shown. As shown in FIG. 4, the GUI 33 may include an upload window 35, which allows the user to upload the user statement 16. The upload window 35 may include a freeform field 36 to allow the user to enter the file location of the user statement 16 to be uploaded. The upload window 35 may additionally or alternatively include an upload button 38 to allow the user to browse file locations of the user device 10 to identify the user statement 16 to be uploaded. The upload window 35 may include a submit button 40 which, when clicked, causes the selected file of the user statement 16 on the user device 10 to be uploaded and displayed on the GUI 33. It will be appreciated that other formats for uploading user statements 16 may be used. For example, the user may log in to a secure account using the user device 10, which secure account stores user statements 16 of the user for the user to view.

With continued reference to FIG. 4, the user statement 16 may be displayed on the GUI showing each transaction initiated by the user using the portable financial device during the time period associated with the user statement 16. The GUI 33 may also include a display recommendations feature 42. The display recommendations feature 42 may allow the user to determine whether recommendations for potential familiar merchant names that may be unfamiliar merchant names is to be displayed on the user statement. The display recommendations features 42 may include radio buttons, as shown, or may be activated using other methods, such as a dropdown box. When the display recommendations feature 42 is activated (as shown), a recommended familiar merchant name may be displayed for unfamiliar merchant names. For example, the recommended potential familiar merchant name for unfamiliar merchant name "Payment Gateway 1" is "Home Improvement Store". The user may indicate which merchant names listed on the user statement 16 are unfamiliar merchant names using any sufficient method, or the recommendation system may determine which merchant names listed on the user statement 16 may be unfamiliar merchant names and display recommendations on those unfamiliar merchant names. The user may indicate which recommendations of potential familiar merchant names are correct or incorrect by communicating a confirmation message or rejection message, as appropriate, as previously described.

Referring to FIG. 5, database entries of a payment gateway database 46 including data associated with payment gateways is shown. The payment gateway database 46 may be included in the recommendation database 14 or may be a separate database in communication with the recommendation system 12. The payment gateway database 46 may include a list of known payment gateways 48 (e.g., Payment Gateway 1, Payment Gateway 2, Payment Gateway 3). The payment gateway database 46 may also include a URL 50 associated with each of the known payment gateways. The payment gateway database 46 may also include an association score 52 for each known payment gateway 48.

The association score 52 may be a score indicating the likelihood that the associated known payment gateway 48 is the unfamiliar merchant name listed on the user statement 16. The association score 52 may be determined based on past data of other users (crowd-sourced data) that indicates how often the known payment gateway 48 was determined to be the unknown merchant name listed on a user statement 16. The association score 52 may be represented using any suitable method of quantitatively or qualitatively representing how often the known payment gateway 48 was determined to be the unknown merchant name listed on a user statement 16. For example, the association score 52 may be a score out of 100, may be a count of the number of times the known payment gateway was or was not an unknown merchant name, may be a letter grade, and the like.

If the user statement 16 includes an unfamiliar merchant name that matches one of the known payment gateways 48 and the association score 52 for that known payment gateway 48 has a score suitable according to a rules-based protocol, the recommendation system 12 may scan the browser history of the user device 10 to determine a potential familiar merchant name. A suitable score, for example, may include the association score 52 having at least a certain value out of 100 in order to scan the browser history of the user device 10. In some non-limiting embodiments or aspects, the known payment gateways 48 may not have an association score 52, and the recommendation system 12 scans the browser history of the user device 10 if the unfamiliar merchant name matches a known payment gateway 48 of the payment gateway database 46.

Referring to FIG. 6, a browser history 54 including browser data on a user device 10 is shown. The browser history 54 may include a list of websites visited 56 by the user and a time visited 58 for each website. Other relevant information may be included in the browser history 54 as browser data as required. In some non-limiting embodiments or aspects, the user device 10 of which the recommendation system 12 scans the browser history 54 may be the user device which submitted the chargeback request. In some non-limiting examples, the user device 10 for which the recommendation system 12 scans the browser history 54 may be a user device associated with the portable financial device and/or associated with the user. The browser history 54 of multiple user devices may be scanned by the recommendation system 12.

With continued reference to FIG. 6, the recommendation system 12 may scan the browser history 54 for a predetermined payment pattern, which may indicate that the user initiated a purchase at a potential familiar merchant name associated with the payment gateway (which was determined to be the unfamiliar merchant name). The predetermined payment pattern may scan for one of the websites visited 56 to be the URL 50 associated with the payment gateway 48 (see FIG. 5). In one non-limiting embodiment or aspect, the URL 50 associated with the payment gateway 48 may appear in the browser history 54 in between two instances of the website of a potential familiar merchant name. This may indicate that the website associated with a potential familiar merchant name redirected the user to the URL 50 associated with the payment gateway 48 in order to process the payment transaction, and then the URL 50 redirected the user back to the website of the potential familiar merchant name after the transaction was processed.

With continued reference to FIG. 6, one non-limiting embodiment or aspect of a predetermine payment pattern is shown. The browser history 54 of the user device 10 indicates that the user visited (www.HIS.com) at 6:35:33 PM, which is a website of a potential familiar merchant name. At a later time, the browser history 54 indicates that the user visited the URL 50 of Payment Gateway 1 at 6:36:12 PM, which was the unfamiliar merchant name listed on the user statement 16 (see FIG. 2). Finally, the website of the potential familiar merchant name again at 6:37:45 PM. Based on this pattern, the recommendation system 12 may determine that the user initiated a purchase with the potential familiar merchant name. The browser history 54 shows the payment pattern being consecutively visited websites; however, it will be appreciated that the user may have visited interceding websites, such that the redirection between the potential familiar merchant name and the payment gateway may not be consecutive, but may still indicate that the user initiated a purchase at the potential familiar merchant name. In some non-limiting embodiments or aspects, the recommendation system 12 may determine whether the user directly accessed the URL 50 associated with the payment gateway 48 or whether the user accessed the URL 50 associated with the payment gateway 48 by being redirected from the website of the potential familiar merchant name. Other predetermined payment patterns may be utilized by the recommendation system 12 to determine the potential familiar merchant name.

Referring to FIG. 7, a database entry in a business entity database 60 associating a business entity with a payment gateway is shown. The business entity database 60 may be a database of the recommendation database 14 or may be a separate database in communication with the recommendation system 12. The business entity database 60 may include a list of business entities 62, a URL 64 associated with each business entity, a payment gateway 66 associated with each business entity, and an association score associated with each business entity. Other relevant information may be included in the business entity database.

With continued reference to FIG. 7, upon the recommendation system 12 scanning the browser history and determining that a predetermined payment pattern exists, the recommendation system 12 may communicate with the recommendation database 14 or other database including the business entity database 60 to determine whether the potential familiar merchant name having the predetermine payment pattern is included in the business entity table. The recommendation system 12 may search based on at least a portion of the potential familiar merchant name to determine whether the business entity database 60 includes a matching business entity 62 or may search on the entire potential familiar merchant name. For example, the recommendation system 12 may split the potential familiar merchant name into words or special characters or concatenate combinations of words to more accurately determine whether the potential familiar merchant name may be associated with business entity 62 in the business entity database 60.

The recommendation system 12 may determine whether the potential familiar merchant name matching the business entity 62 is associated with the known payment gateway 48 to determine that the browser history indicates potential purchase activity (predetermined payment pattern) from the potential familiar merchant name. For example, in FIG. 7, the potential familiar merchant name (Home Improvement Store) is associated with Payment Gateway 1, which is the unfamiliar merchant name listed on the user statement 16 (match between unfamiliar merchant name and potential familiar merchant name).

The recommendation system 12 may also analyze the association score 68 associated with the business entity 62. The association score 68 may indicate the likelihood that the business entity 62 is associated with an unfamiliar merchant name and/or the particular unfamiliar merchant name from the chargeback message. The association score 68 may be based on past data of other users (crowd-sourced data) that indicates how often the potential familiar merchant name was confirmed or rejected to be an unfamiliar merchant name or the particular unfamiliar merchant name in the chargeback message). The association score 68 may be represented using any suitable method of quantitatively or qualitatively representing how often the business entity 62 was determined to be the unfamiliar merchant name (e.g., listed on a user statement 16 and in the chargeback message). For example, the association score 68 may be a score out of 100, may be a count of the number of times the known payment gateway was an unknown merchant name, may be a letter grade, and the like.

If the association score 68 for the potential familiar merchant name is suitable according to a rules-based protocol, the recommendation system 12 may generate and communicate the recommendation message as previously described. A suitable score, for example, may include the association score 68 having at least a certain value out of 100. In some non-limiting embodiments or aspects, the recommendation system 12 may not utilize an association score 68.

Referring back to FIGS. 5 and 7, in response to receiving the previously described confirmation message and/or rejection message, the recommendation system 12 may suitably update the association scores 52, 68 associated with the known payment gateway 48 and business entity 62, respectively. For example, the confirmation message may cause the recommendation system 12 to update the association score 68 of the business entity to indicate a higher likelihood that the unfamiliar merchant name is associated with the potential familiar merchant name. Conversely, the rejection message may cause the recommendation system 12 to update the association score 68 of the business entity to indicate a lower likelihood that the unfamiliar merchant name is associated with the potential familiar merchant name. The updated association scores may be used for determining potential familiar merchant names for unfamiliar merchant names associated with subsequent chargeback messages (from the same or different users).

Figure 8:
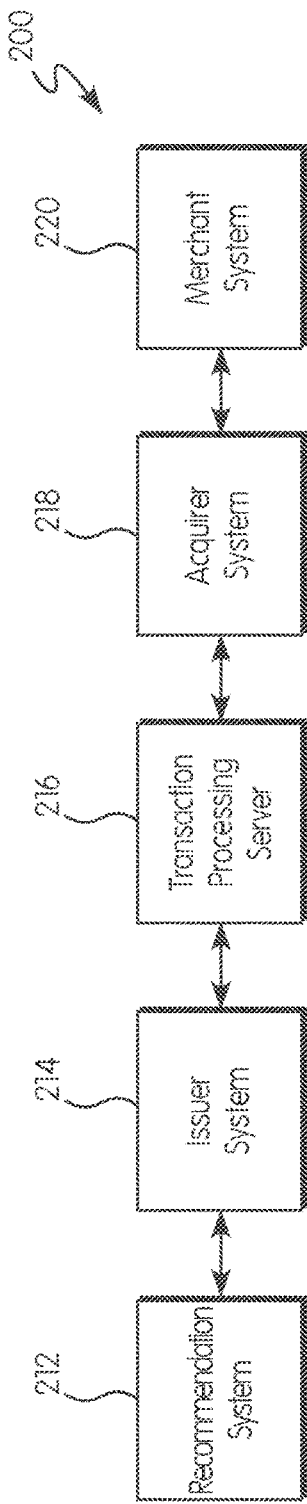
FIG. 8 shows a schematic view of one non-limiting embodiment or aspect of a system for updating an unfamiliar merchant name with a familiar merchant name.

Referring to FIG. 8, a system 200 for updating an unfamiliar merchant name with a familiar merchant name is shown. The recommendation system 212 of FIG. 8 has all of the same feature of the previously described recommendation system 12 (FIG. 1) and includes the following further features. The recommendation system 212 may periodically communicate with merchants (merchant systems thereof) to cause merchants to update unfamiliar merchant names, based on users finding the unfamiliar merchant name of the merchant on their user statement 16 unfamiliar.

The recommendation system 212 may communicate with an issuer system 214 of the portable financial device of a user to communicate an unfamiliar merchant name for the merchant system 220 to update. It will be appreciated that in some non-limiting embodiments or aspects the recommendation system 212 and the issuer system 214 may be components of the same system operated by or on behalf of the issuer or recommendation system 212 and the issuer system 214 may be separate computer systems. The issuer system 214 may communicate with a transaction processing server 216 operated by or on behalf of a transaction service provider associated with the portable financial device to communicate the unfamiliar merchant name for the merchant system 220 to update. The transaction processing server 216 may communicate with an acquirer system 218 associated with the merchant associated with the unfamiliar merchant name. The acquirer system 218 may communicate with a merchant system 220 associated with the merchant associated with the unfamiliar merchant name. Upon receiving the communication to update the unfamiliar merchant name, the merchant system 220 may be updated to replace the unfamiliar merchant name with a tradename of the merchant which would be recognizable to users. This update may prevent future chargeback messages associated with "friendly fraud" from users because the tradename recognizable to the user would not cause the user to suspect a fraudulent transaction (because the user recognizes the transaction as one that he/she initiated). It will be appreciated that, in some non-limiting embodiments or aspects, the recommendation system 212 may communicate directly with the merchant system 220 to communicate an unfamiliar merchant name for the merchant system 220 to update.

With continued reference to FIG. 8, in some non-limiting embodiments or aspects, the recommendation system 212 may communicate with the merchant system 220 to communicate an unfamiliar merchant name for the merchant system 220 to update after a single instance of a user identifying a merchant name as an unfamiliar merchant name. In other non-limiting embodiments or aspects, the recommendation system 212 may communicate with the merchant system 220 to communicate an unfamiliar merchant name for the merchant system 220 to update after a plurality of separate users have identified the same merchant name as an unfamiliar merchant name, such that the recommendation system 212 communicates with the merchant system 220 after a predetermined number of users have indicated the merchant name as an unfamiliar merchant name. The recommendation system 212 may communicate with merchant systems 220 that require an unfamiliar merchant name to be updated periodically, such as daily, weekly, monthly, quarterly, and the like. In this way, merchant systems 220 periodically update unfamiliar merchant names identified by users, which reduces future chargeback requests associated with "friendly fraud"

Figure 9:
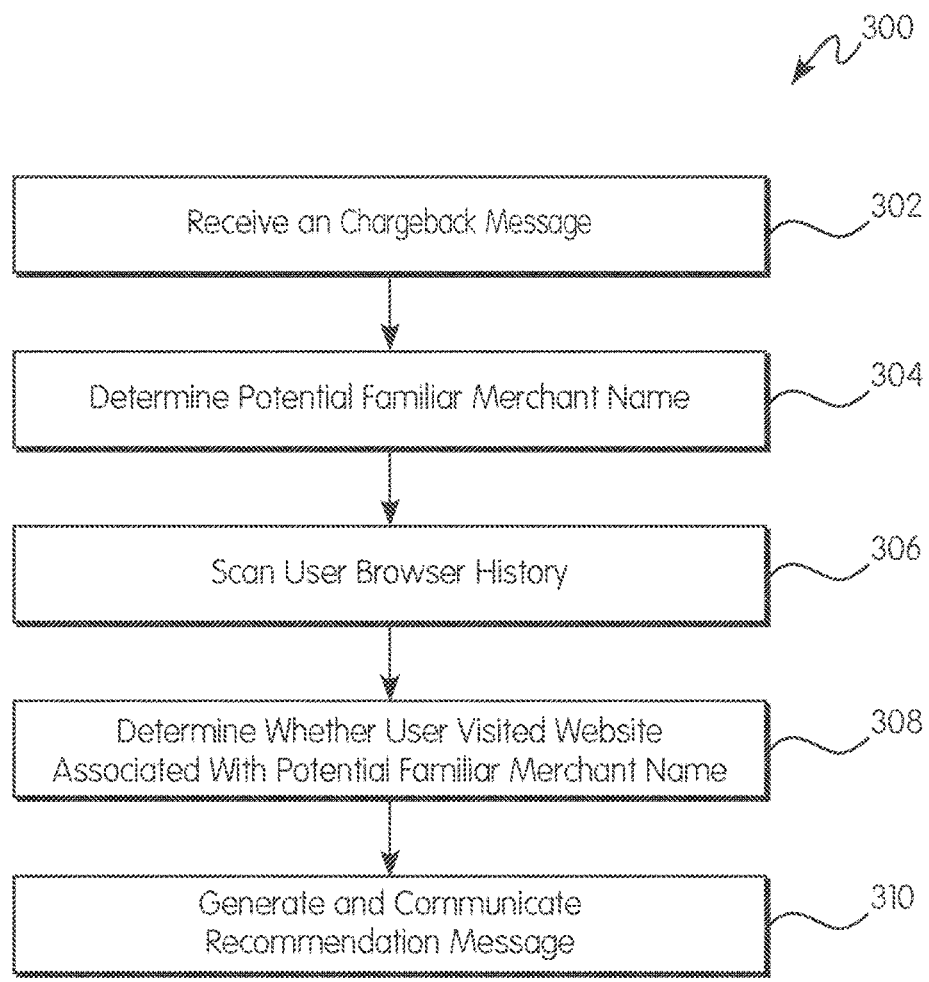
FIG. 9 shows a step diagram of one non-limiting embodiment or aspect of a method for processing a chargeback request according to the present disclosure.

Referring to FIG. 9, a method 300 for processing a chargeback request is shown. The method 300 may process chargeback requests associated with an online transaction. At first step 302, the recommendation system 12 may receive a chargeback message from the user device, and the chargeback message may be associated with the at least one online transaction between the user and at least one merchant. The chargeback message may include at least one unfamiliar merchant name associated with the at least one merchant, as identified by the user.

With continued reference to FIG. 9, at a second step 304, based at least partially on the unfamiliar merchant name in the chargeback message the recommendation system 12 may determine at least one potential familiar merchant name associated with the at least one unfamiliar merchant name. At a third step 306, in response to determining the at least one potential familiar merchant name, the recommendation system 12 may scan a browser history of the user device 10 comprising browser data.

At a fourth step 308, the recommendation system 12 may determine, based at least partially on the browser data, whether the user visited a website associated with the at least one potential familiar merchant name. At a fifth step 310, in response to determining that the user visited the website associated with the at least one potential familiar merchant name, the recommendation system 12 may generate and communicate to the user device a recommendation message including the at least one potential familiar merchant name.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method, comprising:
providing by a browser plug in of a web browser of a computing device, a message associated with an online transaction between a user and a merchant, wherein the message comprises an unfamiliar merchant name associated with the merchant, and wherein the unfamiliar merchant name is a name corresponding to a payment gateway associated with at least one potential familiar merchant name;
determining, by the browser plug in of the web browser of the computing device, the at least one potential familiar merchant name based on the unfamiliar merchant name associated with the online transaction between the user and the merchant;
scanning, by the browser plug in of the web browser, a browser history of the web browser for a predetermined payment pattern that includes the at least one potential familiar merchant name based on determining the at least one potential familiar merchant name, wherein the browser history of the web browser comprises browser data of the user, and wherein scanning the browser history of the web browser for the predetermined payment pattern that includes the at least one potential familiar merchant name comprises:
scanning, by the browser plug in, the browser data of the browser history for the predetermined payment pattern that includes the at least one potential familiar merchant name based on the user device granting permission to the browser plug in to scan the browser data;
identifying, by the browser plug in, the predetermined payment pattern in the browser data of the browser history; and
identifying, by the browser plug in, a uniform resource location (URL) associated with the payment gateway in the browser data; and
providing, by the browser plug in of the web browser, the at least one potential familiar merchant name in response to determining that the user visited a website associated with the at least one potential familiar merchant name.

2. The computer-implemented method of claim 1, further comprising:
receiving a message associated with the online transaction between the user and the merchant, wherein the message comprises the unfamiliar merchant name, and wherein the unfamiliar merchant name is a name corresponding to a payment gateway associated with the at least one potential familiar merchant name.

3. The computer-implemented method of claim 2, further comprising:
updating an association score of the at least one potential familiar merchant name in response to receiving a second message, wherein the second message comprises the unfamiliar merchant name, and wherein the association score indicates a likelihood that the at least one potential familiar merchant name is associated with the unfamiliar merchant name.

4. The computer-implemented method of claim 3, further comprising:
confirming a determination of the at least one potential familiar merchant name based on the association score of the at least one potential familiar merchant name in response to receiving a second message, wherein the second message comprises the unfamiliar merchant name.

5. The computer-implemented method of claim 1, further comprising:
receiving a rejection message disassociating the unfamiliar merchant name with the at least one potential familiar merchant name; and
initiating a fraud response protocol in response to receiving the rejection message.

6. The computer-implemented method of claim 1, wherein determining the at least one potential familiar merchant name comprises:
scanning at least one data resource by initiating a search process including at least a portion of the unfamiliar merchant name; and
determining the at least one potential familiar merchant name based on a result of the search process;
wherein the at least one data resource comprises at least one of the following: the Internet, a remote database, a third party database, a crowd-sourced database, a database local to the computing device, a database associated with the user, or any combination thereof.

7. A system, comprising:
at least one processor of a computing device, wherein the at least one processor is programmed or configured to:
provide, via a browser plug in of a web browser of the computing device, a message associated with a transaction between a user and a merchant, wherein the message comprises an unfamiliar merchant name associated with the merchant, and wherein the unfamiliar merchant name is a name corresponding to a payment gateway associated with at least one potential familiar merchant name;

determine, via the browser plug in of the web browser, the at least one potential familiar merchant name based on the unfamiliar merchant name associated with the online transaction between the user and the merchant;

scan, via the browser plug in of the web browser, a browser history of the web browser for a predetermined payment pattern that includes the at least one potential familiar merchant name in response to determining the at least one potential familiar merchant name, wherein the browser history of the web browser comprises browser data of the user, and wherein, when scanning the browser history of the web browser for the predetermined payment pattern that includes the at least one potential familiar merchant name, the at least one processor is programmed or configured to:

scan, via the browser plug in, the browser data of the browser history for the predetermined payment pattern that includes the at least one potential familiar merchant name based on the user device granting permission to the browser plug in to scan the browser data;

identify, via the browser plug in, the predetermined payment pattern in the browser data of the browser history; and identify, via the browser plug in, a uniform resource location (URL) associated with the payment gateway in the browser data; and provide, via the browser plug in of the web browser, the at least one potential familiar merchant name in response to determining that the user visited a website associated with the at least one potential familiar merchant name.

8. The system of claim 7, wherein the at least one processor is further programmed or configured to:

receive a message associated with the online transaction between the user and the merchant, wherein the message comprises the unfamiliar merchant name, and wherein the unfamiliar merchant name is a name corresponding to a payment gateway associated with at least one potential familiar merchant name; and update an association score of the at least one potential familiar merchant name, wherein the association score indicates a likelihood that the at least one potential familiar merchant name is associated with the unfamiliar merchant name.

9. The system of claim 8, wherein the at least one processor is further programmed or configured to:

confirm a determination of the at least one potential familiar merchant name based on the association score of the at least one potential familiar merchant name in response to receiving a message, wherein the message comprises the unfamiliar merchant name.

10. The system of claim 7, wherein the at least one processor is further programmed or configured to:

receive a rejection message disassociating the unfamiliar merchant name with the at least one potential familiar merchant name; and initiate a fraud response protocol in response to receiving the rejection message.

11. The system of claim 10, wherein the at least one processor is further programmed or configured to:

update an association score of the at least one potential familiar merchant name in response to receiving the rejection message, wherein the association score indicates a likelihood that the at least one potential familiar merchant name is associated with the unfamiliar merchant name.

12. The system of claim 7, wherein, when determining the at least one potential familiar merchant name, the at least one processor is programmed or configured to:

scan at least one data resource by initiating a search process including at least a portion of the unfamiliar merchant name; and determine the at least one potential familiar merchant name based on a result of the search process;

wherein the at least one data resource comprises at least one of the following: the Internet, a remote database, a third party database, a crowd-sourced database, a local database, a database associated with the user, or any combination thereof.

13. A computer program product, the computer program product comprising at least one non-transitory computer-readable medium including one or more instructions that, when executed by at least one processor, cause the at least one processor to:

provide, via a browser plug in of a web browser of the computing device, a message associated with at least one online transaction between a user and a merchant, wherein the message comprises an unfamiliar merchant name associated with the merchant, and wherein the unfamiliar merchant name is a name corresponding to a payment gateway associated with at least one potential familiar merchant name;

determine, via the browser plug in of the web browser, at least one potential familiar merchant name based on the unfamiliar merchant name associated with the online transaction between the user and the merchant;

scan, via the browser plug in of the web browser, a browser history of the web browser for a predetermined payment pattern that includes the at least one potential familiar merchant name in response to determining the at least one potential familiar merchant name, wherein the browser history of the web browser comprises browser data of the user, and wherein, when scanning the browser history of the web browser for the predetermined payment pattern that includes the at least one potential familiar merchant name, the at least one processor is programmed or configured to:

scan, via the browser plug in, the browser data of the browser history for the predetermined payment pattern that includes the at least one potential familiar merchant name based on the user device granting permission to the browser plug in to scan the browser data;

identify, via the browser plug in, the predetermined payment pattern in the browser data of the browser history; and identify, via the browser plug in, a uniform resource location (URL) associated with the payment gateway in the browser data; and provide the at least one potential familiar merchant name in response to determining that the user visited a website associated with the at least one potential familiar merchant name.

14. The computer program product of claim 13, wherein the one or more instructions further cause the at least one processor to:
- receive a confirmation message associating the unfamiliar merchant name with the at least one potential familiar merchant name.

15. The computer program product of claim 14, wherein the one or more instructions further cause the at least one processor to:
- update an association score of the at least one potential familiar merchant name in response to receiving the confirmation message, wherein the association score indicates a likelihood that the at least one potential familiar merchant name is associated with the unfamiliar merchant name.

16. The computer program product of claim 15, wherein the one or more instructions further cause the at least one processor to:
- confirm a determination of the at least one potential familiar merchant name based on the association score of the at least one potential familiar merchant name in response to receiving a second message, wherein the second message comprises the unfamiliar merchant name.

17. The computer program product of claim 13, wherein the one or more instructions further cause the at least one processor to:
- receive a rejection message disassociating the unfamiliar merchant name with the at least one potential familiar merchant name;
- initiate a fraud response protocol in response to receiving the rejection message; and
- update an association score of the at least one potential familiar merchant name in response to receiving the rejection message, wherein the association score indicates a likelihood that the at least one potential familiar merchant name is associated with the unfamiliar merchant name.

* * * * *